United States Patent
Woutters (10) Patent No.: US 10,421,831 B2
(45) Date of Patent: Sep. 24, 2019

(54) METHOD FOR IMPROVING FRACTURE TOUGHNESS OF POLYISOCYANURATE COMPRISING REACTION PRODUCTS

(71) Applicant: Huntsman International LLC, The Woodlands, TX (US)

(72) Inventor: Steve Andre Woutters, Deurne (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 15/748,862

(22) PCT Filed: May 26, 2016

(86) PCT No.: PCT/EP2016/061912
§ 371 (c)(1),
(2) Date: Jan. 30, 2018

(87) PCT Pub. No.: WO2017/025213
PCT Pub. Date: Feb. 16, 2017

(65) Prior Publication Data
US 2018/0215853 A1    Aug. 2, 2018

(30) Foreign Application Priority Data
Aug. 7, 2015 (EP) .................................... 15180199

(51) Int. Cl.
| | |
|---|---|
| *C08G 18/02* | (2006.01) |
| *C08G 18/48* | (2006.01) |
| *C08G 18/66* | (2006.01) |
| *C08G 18/40* | (2006.01) |
| *C08G 18/16* | (2006.01) |
| *C08G 18/73* | (2006.01) |
| *C08G 18/75* | (2006.01) |
| *C08G 18/76* | (2006.01) |
| *C08K 3/013* | (2018.01) |
| *C08K 7/02* | (2006.01) |
| *C08K 7/28* | (2006.01) |
| *C08K 11/00* | (2006.01) |

(52) U.S. Cl.
CPC ......... *C08G 18/022* (2013.01); *C08G 18/161* (2013.01); *C08G 18/4045* (2013.01); *C08G 18/4845* (2013.01); *C08G 18/4854* (2013.01); *C08G 18/6674* (2013.01); *C08G 18/735* (2013.01); *C08G 18/75* (2013.01); *C08G 18/76* (2013.01); *C08G 2105/02* (2013.01); *C08G 2120/00* (2013.01); *C08K 3/013* (2018.01); *C08K 7/02* (2013.01); *C08K 7/28* (2013.01); *C08K 11/005* (2013.01)

(58) Field of Classification Search
CPC .... C08G 18/022; C08G 18/75; C08G 18/161; C08G 18/735; C08G 18/76; C08G 18/4845; C08G 18/4045; C08G 18/6674; C08G 18/4854; C08G 2120/00; C08G 2105/02; C08K 7/02; C08K 7/28; C08K 3/013; C08K 11/005
See application file for complete search history.

(56) References Cited

U.S. PATENT DOCUMENTS 5,322,914 A    6/1994 McInnis et al.

FOREIGN PATENT DOCUMENTS

| EP | 2602271 A | 6/2013 |
|---|---|---|
| JP | 2011212794 A | * 10/2011 |
| WO | 2010121898 A | 10/2010 |
| WO | 2014191131 A | 12/2014 |

\* cited by examiner

*Primary Examiner* — Rabon A Sergent
(74) *Attorney, Agent, or Firm* — Huntsman International LLC; Robert Diaz (57) ABSTRACT

A curable composition for making polyisocyanurate comprising products obtained by combining and mixing at an isocyanate index of at least 100 at least a polyisocyanate composition, a polytetrahydrofuran polyol (P-THF) having average molecular weight in range 1000-5000 g/mol as toughening agent and diols having an average molecular weight <1000 g/mol.

23 Claims, 1 Drawing Sheet

METHOD FOR IMPROVING FRACTURE TOUGHNESS OF POLYISOCYANURATE COMPRISING REACTION PRODUCTS

CROSS-REFERENCE TO RELATED APPLICATIONS

This application is the National Phase of International Application PCT/EP2016/061912 filed May 26, 2016 which designated the U.S. and which claims priority to European App. Serial No. 15180199.0 filed Aug. 7, 2015. The noted applications are incorporated herein by reference.

FIELD OF INVENTION

The present invention relates to methods for improving the fracture toughness of polyisocyanurate comprising materials.

The present invention is further related to the use of special polyol compositions in order to make the polyisocyanurate matrix of the polyisocyanurate comprising materials more tough.

The present invention is further related to the use of special polyol compositions to increase the fracture toughness of the polyisocyanurate comprising materials by combining short chain diols for molecular redesign of polyisocyanurate resin for enhanced toughenability and the use of p-THF polyol as an especially suitable phase-separating polyol The present invention further relates to polyisocyanurate comprising materials having increased toughness.

The present invention further relates to polyisocyanurate comprising materials having a glass transition temperature >100° C.

In particular the invention relates to polyisocyanurate comprising materials prepared by using >40 wt % polyisocyanates calculated on the total weight of the reactive curable composition, preferably more than 50%, more preferably more than 60%.

The polyisocyanurate comprising materials according to the present invention are very suitable to make polyisocyanurate comprising materials (PIR) having a glass transition temperature >100° C. and a significantly improved fracture toughness value.

BACKGROUND OF THE INVENTION

Structural composites are known to be useful for many applications such as electrical, aerospace, transportation and outdoor sports equipment's applications.

Isocyanate polyaddition reaction products such as polyisocyanurate comprising materials are commonly used as the polymer matrix in structural composites. The cured polyisocyanurate comprising materials are known for their good thermal, mechanical, and chemical properties but they have insufficient toughness and tend to be brittle upon cure.

In addition, the polyisocyanurate comprising materials are known to be very difficult to toughen and some may be too brittle to toughen effectively. Attempts to increase the fracture toughness in the past often came at the expense of changes (typically reduction) in modulus and of reductions in thermal properties e.g. glass transition temperature ($T_g$) thereby creating unacceptable limits on the applicability of the resulting composite.

For example, to increase the toughness of polyisocyanurate comprising materials, plasticizers have been added as additives giving these materials improved flexibility and durability. Most commonly phthalate esters were used as plasticizers. Plasticizers work by embedding themselves between the chains of polymers, spacing them apart (increasing the "free volume"), however, this improvement in toughness usually lead to a significant drop in modulus and glass transition temperature ($T_g$).

Controlling the fracture toughness of polyisocyanurate comprising materials may also be done by varying the amount of polyols having a high molecular weight. This however also leads to materials having lower glass transition temperatures and lower modulus.

Accordingly, there is a need in the industry to develop a curable polyisocyanate composition for making structural polyisocyanurate comprising composites with improved ductility (i.e. fracture toughness) while still maintaining other key processing (e.g. viscosity) and performance (e.g. glass transition temperature and modulus) properties.

AIM OF THE INVENTION

It is a goal of the invention to improve the fracture toughness of polyisocyanurate comprising materials having a glass transition temperature ($T_g$)>100° C.

It is a further object of the present invention to develop structural polyisocyanurate comprising components which can withstand high external forces and can be used, for example, in automobile construction. The structural components to be developed, also referred to as composite elements, should be able to serve as replacements for known steel structures and, in particular, have advantages in respect of their weight, manufacturing process and maintenance intensity.

SUMMARY OF THE INVENTION

A reactive curable composition for making polyisocyanurate comprising products having a glass transition temperature (Tg)>100° C. is disclosed. Said curable composition is obtained by combining and mixing at an isocyanate index of at least 100:
  a) at least 40 wt % polyisocyanates calculated on the total weight of the curable composition, and
  b) 1-30 wt % polytetrahydrofuran (P-THF) having an average molecular weight in the range 1000-5000 g/mol as toughening agent calculated on the total weight of the curable composition, and
  c) at least 20 wt % low molecular weight polyols having a number average molecular weight <1000 g/mol calculated on the total weight of the curable composition, and
  d) A trimerization catalyst composition, and
  e) Optionally further additives and/or auxiliary compounds.
  Wherein the wt % of aromatic hydrocarbon rings in the curable composition (aromaticity) is at least 25 wt % calculated on the total weight of the reactive curable composition.

According to embodiments, the amount of polyisocyanates in the curable composition comprises preferably at least 50 wt % polyisocyanates, more preferably at least 60 wt % polyisocyanates calculated on the total weight of the reactive curable composition.

According to embodiments, the aromaticity of the curable composition is preferably >30 wt %, more preferably >35 wt % and most preferably ≥50 wt % calculated on the total weight of the reactive curable composition.

According to embodiments, the low molecular weight polyols in the curable composition comprise aromatic polyols, preferably aromatic polyester polyols, and more preferably aromatic polyester diols.

According to embodiments, the low molecular weight polyols in the curable composition according to the invention comprise diols having a molecular weight (MW) below 1000 g/mol selected from alkylene glycols and/or oxyalkylene glycols.

According to embodiments, the low molecular weight polyols in the curable composition according to the invention are diols having a molecular weight (MW) below 1000 g/mol selected from alkylene glycols and/or oxyalkylene glycols.

According to embodiments, the low molecular weight polyols in the curable composition according to the invention are diols selected from polyethylene glycol and/or polypropylene glycol-(1,2) and -(1,3), polybutylene glycol-(1,4) and -(2,3), polyhexanediol-(1,6), polyoctanediol-(1,8) and mixtures thereof.

According to embodiments, the amount of P-THF in the curable composition according to the invention is in the range from 1 wt % to 25 wt %, preferably from 1 wt % to 15 wt %, more preferably from 1 wt % to 10 wt % based on the total weight of the reactive curable polyisocyanate composition and wherein the molecular weight of the P-THF is in the range 1000-3000, preferably in the range 1000-2000 g/mol.

According to embodiments, the polyisocyanates in the curable composition according to the invention are selected from aliphatic, cycloaliphatic, araliphatic and, preferably, aromatic polyisocyanates, such as toluene diisocyanate in the form of its 2,4 and 2,6-isomers and mixtures thereof, diphenylmethane diisocyanates and variants thereof, and mixtures of diphenylmethane diisocyanates (MDI) and also oligomers thereof which have an isocyanate functionality greater than 2.

According to embodiments, the trimerisation catalyst composition in the curable composition according to the invention is selected from alkali and/or earth alkali metal salts of organic carboxylic acids preferably having 1-12 carbon atoms, such as potassium acetate or potassium 2-ethylhexanoate such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to embodiments, the trimerisation catalyst composition in the curable composition according to the invention is selected from a composition containing a lithium halide (preferably LiCl), an epoxy resin and optionally a urea compound.

According to embodiments, the trimerisation catalyst composition in the curable composition according to the invention is used in a quantity of from 0.001 to 10 wt %, preferably from 0.1 to 5 wt %, most preferably 0.5 to 2.0 wt % calculated on the total weight of the curable composition.

According to embodiments, the auxiliary compounds in the curable composition according to the invention are selected from non-isocyanate-reactive solvents, surfactants, scavengers, like alkylorthoformate and in particular triisopropylorthoformate, antimicrobial agents, fire retardants, smoke suppressants, UV-stabilizers, colorants, plasticizers, internal mould release agents, rheology modifiers, wetting agents, dispersing agents and fillers.

According to embodiments, the auxiliary compounds in the curable composition according to the invention the auxiliary compounds comprise filler materials which are selected from wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials.

The invention further discloses a process for making the curable composition according to the invention, which comprises combining and mixing the ingredients (a) to (e) at ambient pressure and at a temperature between 5° C. and 45° C. and more preferably between 5° C. and 30° C.

The invention further discloses a method for making polyisocyanurate comprising materials having a glass transition temperature (Tg)>100° C. and improved toughness ($G_{1c}$>500 J/m$^2$), said method comprises at least the steps of allowing the curable composition according to any of claims 1-13 to react at an isocyanate index of at least 100 and at a curing temperature above 50° C. and preferably above 80° C.

According to embodiments, the method for making polyisocyanurate comprising materials according to the invention, is a batch-wise, semi-continuously or continuously process, an injection-, an extrusion-, a pultrusion process or moulding process such as a compression moulding process, a resin transfer moulding process, a vacuum assisted moulding process, a resin infusion moulding process, a prepregging process.

According to embodiments, the method for making polyisocyanurate comprising materials according to the invention is performed using an isocyanate index is in the range 100 up to 15000, preferably in the range 100-500, more preferably in the range 100-300.

According to embodiments, the method for making polyisocyanurate comprising materials according to the invention is performed using a curing temperature between 50° C. and 350° C. and most preferably in the range between 90° C. and 250° C.

The invention further discloses a polyisocyanurate comprising material obtained by the method according to the invention, said material having a glass transition temperature >100° C., a fracture toughness value $G_{1c}$>1000 J/m$^2$, preferably $G_{1c}$>1500 J/m$^2$ and/or toughness value $K_{1c}$>2 MPa·m$^{1/2}$.

The invention further discloses a polyisocyanurate comprising material obtained by the method according to the invention, said material having a glass transition temperature >150° C., a toughness value $G_{1c}$>500 J/m$^{2'}$ more preferably >600 J/m$^2$, and/or a toughness value $K_{1c}$>1 MPa·m$^{1/2}$.

The independent and dependent claims set out particular and preferred features of the invention. Features from the dependent claims may be combined with features of the independent or other dependent claims as appropriate. The above and other characteristics, features and advantages of the present invention will become apparent from the following detailed description, taken in conjunction with the accompanying examples which illustrate, by way of example, the principles of the invention.

Definitions and Terms

In the Context of the Present Invention the Following Terms have the Following Meaning:
1) The composition comprising at least a polyisocyanate composition, a trimerisation catalyst composition and a curing agent compound which comprises isocyanate-reactive hydrogen atoms (such as a polyol) or any other suitable curing agent is in the text referred to as the "curable composition". This composition refers to a liquid composition prior to curing (i.e. prior to the formation of polyisocyanurates).
2) The "isocyanate index" or "NCO index" or index is the ratio of NCO— groups over isocyanate-reactive hydrogen atoms present in a formulation, given as a percentage:

$$\frac{[NCO]}{[active\ hydrogen]} \times 100(\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are taken into account in the calculation of the isocyanate index.
3) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to number average unless indicated otherwise.
6) "Liquid" means having a viscosity of less than 10 Pa·s measured according to ASTM D445-11a at 20° C.
7) "Trimerisation catalyst" as used herein refers to a catalyst being able to catalyse (promote) the formation of isocyanurate groups from polyisocyanates.
8) "Polyisocyanurate comprising materials" refers to a composition comprising more than 10% by weight polyisocyanurate, preferably at least 50% by weight polyisocyanurate, more preferably 75% by weight, calculated on the total weight of the material.
9) "Mc" refers to the average molecular weight between cross-links, e.g. the average molecular weight between cross-links of 2 isocyanurate groups in the polyisocyanurate comprising materials.
10) "Density" refers to the overall density measured according to ISO 845.
11) The "glass transition temperature" ($T_g$) refers to the temperature at which a reversible transition from a hard glass condition into a rubber-elastic condition occurs. The glass transition temperature ($T_g$) was measured according to ASTM D 4065-1, with a forced constant amplitude and a fixed frequency in a dual cantilever. The peak maximum of the Tangent Delta (tan d) profile is taken as the $T_g$
12) "Fracture toughness" is a measure of the energy a sample with a pre-existing crack can absorb before it breaks. In the context of the present invention, the fracture toughness is expressed as a $K_{1c}$ value and/or $G_{1c}$ value, both measured according to ISO 13586. The $G_{1c}$ value (unit J/m$^2$) or the critical energy release rate is a measure for the fracture energy. The $K_{1c}$ value or the critical stress intensity factor is a measure for the critical stress intensity resistance to crack growth initiation. The higher the $G_{1c}$ or $K_{1c}$ value, the better the material is resistant to crack growth initiation.
13) "Aromaticity" refers to the calculated amount (wt %) of aromatic hydrocarbon rings (benzene rings) being present in a composition calculated on the total wt % of the composition.

DETAILED DESCRIPTION

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

Surprisingly we have found that polyisocyanurate comprising materials prepared by using >40 wt % polyisocyanates calculated on the total weight of the reactive curable composition and having a glass transition temperature of at least 100° C. may be significantly improved in fracture toughness and modulus of the products.

Therefore, the invention is dealing with a curable polyisocyanate composition and a method for making said curable composition, said curable composition being suitable for making polyisocyanurate comprising materials with a significant increase in fracture toughness. The curable polyisocyanate composition according to the invention comprises a special polyol composition having isocyanate reactive compounds (curing agent) selected from polytetrahydrofuran (P-THF) polyols which will act as toughening agents in the final polyisocyanurate comprising materials and short chain diols which will give molecular redesign of the polyisocyanurate comprising matrix. The curable polyisocyanate reactive composition according to the invention will result in a polyisocyanurate comprising materials having an improved matrix and with the presence of (second) phase separated domains within the polyisocyanurate comprising matrix after curing. A suitable p-THF polyol will show (sub) micro-phase separation in very small domains having dimensions in the range 100 nm-10 µm, most preferably domains smaller than 0.5 µm. larger scale phase separation will lead to substantial drops in modulus and is not wanted.

According to embodiments, the curable polyisocyanate composition is achieved by combining at least:
 a) at least 40 wt % polyisocyanates calculated on the total weight of the curable composition, and
 b) 1-30 wt % polytetrahydrofuran (P-THF) having an average molecular weight in the range 1000-5000 g/mol as toughening agent calculated on the total weight of the curable composition, and
 c) at least 20 wt % low molecular weight polyols having an average molecular weight <1000 g/mol calculated on the total weight of the curable composition, and
 d) A trimerization catalyst composition, and
 e) Optionally further additives and/or auxiliary compounds.
 Wherein the aromaticity of the curable composition is at least 25 wt % calculated on the total weight of the reactive curable composition.

According to embodiments, the curable polyisocyanate composition according to the invention comprises at least 40 wt % polyisocyanates, preferably at least 50 wt % polyisocyanates, more preferably at least 60 wt % polyisocyanates calculated on the total weight of the (reactive) curable composition.

According to embodiments, the aromaticity of the curable composition is at least 25 wt %, preferably at least 30 wt %, more preferably at least 40 wt % and most preferably ≥50 wt % calculated on the total weight of the reactive curable composition.

The invention comprises a dual approach wherein on the one hand molecular redesign of the polyisocyanurate matrix is realized by using an isocyanate reactive composition comprising short chain diols having average molecular weight below 1000 g/mol and on the other hand introduction of P-THF having average molecular weight in range 1000-5000 g/mol in the polyisocyanurate matrix. The dual approach is crucial if it is the ambition to increase the fracture toughness significantly (e.g. order of magnitude increase of $G_{1c}$).

According to embodiments, the molecular redesign of the polyisocyanurate matrix is achieved by configuring the molecular weight between the crosslinks ($M_c$, g/mol) in the polyisocyanurate matrix. The molecular weight between crosslinks, $M_c$, is preferably >300 g/mol, more preferably >500 g/mol, most preferably ≥700 g/mol. The aim is to increase the molecular weight between the crosslinks hereby reducing the crosslink density.

According to embodiments, the molecular redesign of the polyisocyanurate matrix may be achieved by using low molecular weight diols (MW<1000 g/mol). These low molecular weight diols may act as 'spacers' between isocyanurate crosslinks.

According to embodiments, the molecular redesign of the polyisocyanurate matrix is achieved by using a significant amount of low molecular weight polyols, preferably short chain diols in the isocyanate reactive composition, said diols being defined as polyols having 2 hydroxyl groups resulting in 2 isocyanate reactive hydrogens.

According to embodiments, the molecular redesign of the polyisocyanurate matrix may be achieved by using an isocyanate reactive composition comprising mainly diols that have covalent bonds with low energy barriers to rotation. Examples of such 'rotatable' bonds are ester and/or ether bonds. The short chain diols according to the invention are hence preferably selected from polyether and/or polyester diols having molecular weight below 1000 g/mol, preferably below 500 g/mol. Most preferably the suitable diols are selected from glycols having a molecular weight (MW) below <1000 g/mol, preferably below 500 g/mol, even more preferable below 300 g/mol. They are advantageously simple glycols of the general formula $C_nH_{2n}(OH)_2$ or polyglycols distinguished by intervening ether linkages in the hydrocarbon chain, as represented by the general formula $C_nH_{2n}O(OH)_2$. Examples of suitable glycols include: polyethylene glycol (such as diethylene glycol, triethylene glycol and tetraethylene glycol), polypropylene glycol-(1,2) and -(1,3) (such as dipropylene glycol, tripropylene glycol and tetrapropylene glycol), poly butylene glycol-(1,4) and -(2,3), poly hexanediol-(1,6), poly octanediol-(1,8) and mixtures thereof. An example of a suitable short chain diol is commercially available Arcol® 1004 (polypropylene glycol having molecular weight 425 g/mol).

According to embodiments, the molecular redesign of the polyisocyanurate matrix may be achieved by using a significant amount of low molecular weight polyols, preferably short chain diols as isocyanate reactive compounds. The isocyanate reactive compounds being present in the curable composition may comprise aromatic polyols, preferably said aromatic polyols are aromatic polyester polyols, most preferably said aromatic polyols are aromatic polyester diols. The use of these aromatic (polyester) polyols will limit the decrease, maintain or further increase the aromaticity of the polyisocyanurate matrix. This is a method to retain the modulus of the resin. In case additional aromatic polyols are present in the isocyanate reactive composition, the concentration is always such that the amount of low molecular weight polyols, preferably diols having an average molecular weight <1000 g/mol is at least 50 wt % calculated on the total weight of the isocyanate reactive compounds in the isocyanate-reactive composition.

According to embodiments, suitable aromatic polyester polyols are PET polyols (diols), in this case high segmental resistance to bending and stretching, leading to stiffness, is combined with segmental flexibility due to the presence of rotatable ester bonds.

In an aromatic polyester polyol at least one of the polyol or the polycarboxylic acid, preferably the acid, is an aromatic compound and the aromaticity is at least 40 wt % calculated on the total weight of the polyester polyol. Polyester polyols whose acid component advantageously comprises at least 30 wt % of phthalic acid (or isomers thereof) residues are particularly useful. Preferably the aromaticity of the aromatic polyester polyol is between 70 and 90 wt % calculated on the total weight of the polyester polyol. Preferred aromatic polyester polyols for use in the present invention include STEPA® POL PS2352, PS3152 and PS 1752, all commercially available from Stepan; Hoopol® F-1390, F-1391, F-3362, F-4361, F-4396 and F-7021, all commercially available from Syntesia; and Iso-exter® 3061, 3557, 3446 and 4404, all commercially available from Coim.

P-THF will act as a second-phase toughening agent, which self assembles into a second phase domains in the host polyisocyanurate comprising matrix after curing to further improve the toughness of the (cured) polyisocyanurate comprising material.

The P-THF will provide enhanced fracture toughness even at low loadings (for example, from about 1% to about 10% by weight based on the total weight of the polyisocyanurate comprising material).

The "second phase" means a distinct and different physical phase from the other phase of the polyisocyanurate comprising matrix. Because the modification is limited to a second phase, only small amounts of the P-THF are needed to achieve the desired level of toughness. In general, the effective quantity of the P-THF as the toughening agent in the present invention is in the range 1-30 wt %, preferably in the range of from about 1% to about 25% by weight; more preferably, from about 1% to about 15% by weight; and most preferably from about 1% to about 10% by weight based on the total weight of the final polyisocyanurate comprising product.

Polytetrahydrofuran (P-THF), also called poly(tetramethylene ether) glycol or poly(tetramethylene oxide), is a chemical compound with formula $(C_4H_8O)_n(OH)_2$ or HO—$(—(CH_2)_4O—)_n$—OH and can be regarded as a polymer of tetrahydrofuran, or as the polyether derived from 1,4-butanediol. The chemical structure of P-THF is illustrated below [1]

[1]

P-THF is commercially available as polymers having average molecular weights between 250 and 3000 g/mol. The product is sold under various trade names including Terathane® from Invista and PolyTHF® from BASF According to embodiments, two or more different P-THF polyols (e.g. having different MW) may be blended together to make up the toughening component of the present invention.

The P-THF toughening agent used in the present inventions further improves the fracture resistance, hence improves the fracture toughness, of the polyisocyanurate comprising material. A synergetic effect on the improvement in toughness of the polyisocyanurate comprising material is seen when the P-THF toughening agent is used in combination with the use of specific diols (polyols) in the process for making the isocyanurate matrix.

The amount P-THF toughening agent used to make the polyisocyanurate comprising material according to the invention is generally in the range 1-30 wt %, preferably from about 1 wt % to about 25 wt % based on the total weight of the reactive curable polyisocyanate composition, more preferably from about 2 wt % to about 15 wt % based on the total weight of the reactive curable polyisocyanate composition; and most preferably from about 2.5 wt % to about 10 wt % based on the total weight of the reactive curable polyisocyanate composition.

According to embodiments, the polyisocyanates may be chosen from aliphatic, cycloaliphatic, araliphatic and, preferably, aromatic polyisocyanates as long as the aromaticity of the curable composition is at least 25 wt % calculated on the total weight of the reactive curable composition. Suitable polyisocyanates are toluene diisocyanate in the form of its 2,4 and 2,6-isomers and mixtures thereof, diphenylmethane diisocyanates and variants thereof, and mixtures of diphenylmethane diisocyanates (MDI) and oligomers thereof having an isocyanate functionality greater than 2 known in the art as "crude" or polymeric MDI (polymethylene polyphenylene polyisocyanates). Mixtures of toluene diisocyanate, diphenylmethane diisocyanates and/or polymethylene polyphenylene polyisocyanates may be used as well.

Any compound which catalyses the isocyanate trimerisation reaction (isocyanurate-formation) can be used as trimerisation catalyst in the present invention.

According to embodiments, the trimerization catalyst composition comprises compounds selected from organic metal salts, preferably alkali or earth alkali organic metal salts, more preferably metal carboxylates or alkoxides and mixtures thereof, the carboxylate/alkoxide group preferably having 1-12 carbon atoms such as potassium acetate, potassium hexanoate, potassium ethylhexanoate, potassium octanoate, potassium lactate, sodium ethoxide, sodium formate, potassium formate, sodium acetate, potassium benzoate and mixtures thereof.

According to embodiments, the trimerisation catalyst composition may be selected from alkali metal salts of organic carboxylic acids, such as potassium acetate (commercially available as Polycat® 46 (ex Air Products) and Catalyst LB (ex Huntsman)) or potassium 2-ethylhexanoate (commercially available as Dabco® K15 (ex Air Products)), since these do not promote the isocyanate/water reaction as much as amine containing catalysts. Excessive isocyanate/water reaction will lead to preliminary cure.

According to embodiments, trimerization catalyst composition is selected from a composition containing a lithium halide (preferably LiCl), an epoxy resin and optionally a urea compound. This catalyst composition is described in WO2010/121898 which is incorporated herein by reference. Typically the catalyst composition is such that the number of moles of lithium halide per isocyanate equivalent ranges from 0.0001-0.04.

The trimerisation catalyst composition is generally such that the amount of catalyst compounds being present in the catalyst composition is in range 0.001 to 10% by weight, preferably from 0.1 to 5 wt %, most preferably 0.5 to 2.0 wt % based on total weight of the curable composition.

In addition to the trimerisation promoting catalyst a catalyst to control the curing of the polyurethane can be added. But in preferred embodiments such a catalyst is not present.

Examples of such suitable (polyurethane forming) catalysts are those known per se and include tertiary amines, such as triethyl-, tripropyl-, tributyl- and triamylamine, N-methyl morpholine, N,N-dimethyl cyclohexylamine, N,N-dimethyl benzylamine, 2-methyl imidazole, pyrimidine, dimethylaniline and triethylene diamine. Examples of tertiary amines containing isocyanate-reactive hydrogen atoms are triethanolamine and N,N-dimethyl ethanolamine. Other suitable catalysts are silamines having carbon-silicon bonds and nitrogen-containing bases such as tetraalkyl ammonium hydroxides; alkali hydroxides, alkali phenolates and alkali alcoholates. Organo metallic compounds, especially organo tin compounds, may also be used as catalysts.

The curable composition used to make the polyisocyanurate comprising material according to the invention may further comprise additives and/or auxiliary compounds.

According to embodiments, the auxiliary compounds may be selected from non-isocyanate-reactive solvents, surfactants, scavengers, like alkylorthoformate and in particular tri-isopropylorthoformate, antimicrobial agents, fire retardants, smoke suppressants, UV-stabilizers, colorants, plasticizers, internal mould release agents, rheology modifiers, wetting agents, dispersing agents and fillers.

According to embodiments, filler materials may be selected from wood chips, wood dust, wood flakes, wooden plates; paper and cardboard, both shredded or layered; sand, vermiculite, clay, cement and other silicates; ground rubber, ground thermoplastics, ground thermoset materials; honeycombs of any material, like cardboard, aluminium, wood and plastics; metal particles and plates; cork in particulate form or in layers; natural fibers, like flax, hemp and sisal fibers; synthetic fibers, like polyamide, polyolefin, polyaramide, polyester and carbon fibers; mineral fibers, like glass fibers and rock wool fibers; mineral fillers like $BaSO_4$ and $CaCO_3$; nanoparticles, like clays, inorganic oxides and carbons; glass beads, ground glass, hollow glass beads; expanded or expandable beads; untreated or treated waste, like milled, chopped, crushed or ground waste and in particular fly ash; woven and non-woven textiles; and combinations of two or more of these materials. A particular use is the manufacturing of semi-structural and structural composites comprising basalt fibres, carbon fibres, flax fibres and/or glass fibres.

The combining and mixing of the polyisocyanates and the other ingredients to make the curable composition according to the invention may be conducted at ambient pressure and at a temperature between 5° C. and 45° C. and more preferably between 5° C. and 30° C. in order to avoid undesired premature reactions as much as possible. Alternatively, the combining and mixing of the polyisocyanates and the other ingredients to make the curable composition according to the invention may be conducted using high temperatures and low pressures (vacuum) such as Resin Transfer Moulding (RTM) processes.

According to embodiments, the polyisocyanate composition, trimerization catalyst composition and isocyanate reactive composition may be combined first and then the toughening agent and optional additives and/or auxiliary compounds may be added.

According to embodiments, all the ingredients needed to make the curable composition may be combined simultaneously.

The invention provides a method for making polyisocyanurate comprising materials with improved fracture toughness and glass transition temperature >100° C. Said method comprises at least the steps of allowing the curable composition according to the first aspect of the present invention to react. The start of the reaction may be accelerated by applying heat, like heating the curable composition to a temperature above 50° C. and preferably above 80° C. Then the curable composition cures fast (so-called snap-cure) while the temperature increases further (the reaction is exothermic).

According to embodiments, the method for making polyisocyanurate comprising materials with improved fracture toughness and glass transition temperature >100° C. comprises reacting at an isocyanate index of at least 100, at least the curable composition according to the first aspect of the invention which comprises:
  a) at least 40 wt % polyisocyanates calculated on the total weight of the curable composition, and
  b) 1-30 wt % polytetrahydrofuran (P-THF) having an average molecular weight in the range 1000-5000 g/mol as toughening agent calculated on the total weight of the curable composition, and
  c) at least 20 wt %, diols having an average molecular weight <1000 g/mol calculated on the total weight of the curable composition, and
  d) A trimerization catalyst composition, and
  e) Optionally further additives and/or auxiliary compounds.

Wherein the aromaticity of the curable composition is at least 25 wt % calculated on the total weight of the reactive curable composition.

According to embodiments, the method for making polyisocyanurate comprising materials with improved fracture toughness comprises reacting at an isocyanate index of at least 100 at least the curable composition according to the first aspect of the invention (which comprises at least the components a) to e)) characterized in that the isocyanate-reactive compounds b) comprise compounds selected from diols such that the average molecular weight between cross-links ($M_c$) is >300 g/mol, preferably >500 g/mol, more preferably ≥700 g/mol.

According to embodiments, a moulding process may be used for making the polyisocyanurate comprising materials, in that case it may be conducted according to the cast moulding process, the compression moulding process, the resin transfer moulding process, and especially the vacuum assisted one, the resin infusion process, the prepregging process and the hand lay-up process. The process further may be conducted according to an injection-, an extrusion- or a pultrusion process. Microwave or induction curing may also be applied. The process may be conducted batch-wise, semi-continuously or continuously.

According to embodiments, the polyisocyanurate comprising materials may be blown products and the blowing agents may be selected from inert blowing agents and reactive blowing agents. Examples of inert blowing agents are alkanes, hydrofluorocarbons, hydrochlorofluorocarbons, expandable microbeads and inert gases like air, $N_2$, $CO_2$, CO, $O_2$ and He and examples of reactive blowing agents are azodicarbonamide and water. Water is the most preferred blowing agent. The actual amount of blowing agent needed depends on the ingredients used to make the polyisocyanate polyaddition products, on the production process, on the selected blowing agent and on the desired density. The determination of the amount of blowing agent once the ingredients for making the polyisocyanate polyaddition products, the process and the desired density have been selected, is daily routine for a person who is ordinary skilled in the art.

In addition to the above ingredients, other ingredients used in the art for making materials comprising a plurality of urethane, urea and/or isocyanurate groups may be used like other catalysts, e.g. for enhancing urethane formation, surfactants, fire retardants, colorants, pigments, anti-microbial agents, fillers, internal mould release agents, cell-stabilizing agents and cell-opening agents.

According to embodiments, the method for making the polyisocyanurate comprising materials of the invention comprises a process wherein the compounds of the curable composition are reacted at an isocyanate index in the range 100 up to 15000. Preferably the reaction is conducted at an isocyanate index of preferably 100-500 and most preferably 100-300.

According to embodiments, the polyisocyanurate (PIR) comprising materials and the method for forming said polyisocyanurate comprising materials further comprises after the step of reacting at an isocyanate index in the range 100 up to 15000 the compounds of the curable composition, the step of curing the obtained composition at elevated temperature in order to form a cured polyisocyanurate comprising material/product. The curing may be conducted at a temperature between 50° C. and 350° C. and most preferably in the range between 125° C. and 250° C. This reaction may take between 5 seconds and 10 hours and preferably takes between 15 seconds and 2 hours. The process may be conducted at ambient pressure or at reduced or elevated pressure. Preferably heat is applied in order to bring the (curable) composition to a temperature above 50° C. and most preferably above 80° C. Then the curable composition may cure fast (so-called snap-cure) while the temperature increases further (the reaction is exothermic). Before curing the polyisocyanurate comprising products the (curable) composition may be fed into a mould in order to give it a certain shape or into a cavity of an object in order to provide the object with a polyisocyanurate interior, or onto a surface to provide such a surface with a polyisocyanurate cover, or it may be used to repair an object.

According to embodiments, the polyisocyanurate (PIR) comprising products may be blown products made at an isocyanate index in the range 100 up to 15000, preferably at an isocyanate index in the range 100-300 and wherein water and/or other blowing agent are added in an amount of for example 5 pbw. The actual amount of blowing agent needed depends on the ingredients used to make the polyisocyanurate comprising products, on the production process, on the selected blowing agent and on the desired density. The determination of the amount of blowing agent once the ingredients for making the polyisocyanurate comprising products, the process and the desired density have been selected, is daily routine for a person who is ordinary skilled in the art.

According to embodiments, polyisocyanurate comprising products having increased fracture toughness are disclosed made according to the method of the second aspect of the invention. In particular the polyisocyanurate comprising products have a glass transition temperature >100° C., preferably >120° C., more preferably in the range 120° C.-200° C.

According to embodiments, the polyisocyanurate comprising products have a glass transition temperature >100° C. and a fracture toughness value $G_{1c}$>1000 J/m², preferably $G_{1c}$>1500 J/m².

According to embodiments, the polyisocyanurate comprising products have a fracture toughness value $G_{1c}$>500 J/m², preferably $G_{1c}$>600 J/m² and a glass transition temperature >150° C.

According to embodiments, the polyisocyanurate comprising products have a toughness value $K_{1c}$>2 MPa·m$^{1/2}$ and a glass transition temperature >100° C.

According to embodiments, the polyisocyanurate comprising products have a toughness value $K_{1c}$>1 MPa·m$^{1/2}$ and a glass transition temperature >150° C. and.

The polyisocyanurate comprising products according to the present invention may be used in sporting goods, in high volume production of automotive parts, in train parts, aerospace, marine applications, wind power devices, window lineals, structural parts, adhesives, packaging, encapsulants, insulators and (spray) coatings.

The invention is illustrated with the following examples.

EXAMPLES

Chemicals Used:
Suprasec® 1306: 4,4'-MDI polyisocyanate with NCO-value of 33.5% (Huntsman)
PPG-425: polypropylene glycol with an average molecular weight 425 g/mol, OH value=260-270 (Arcol® 1004-Bayer)
Hoopol® F1394: PET polyester with an average molecular weight of 450 g/mol (Synthesia)
Araldite® DY/T: triglycidyl ether of trimethylolpropane (Huntsman)
MP-diol: 2-methyl-1,3-propanediol
DPG: dipropyleneglycol
pTHF-2000: poly tetramethylene ether glycol with an average molecular weight of 2000 g/mol (Polymeg® 2000-Lyondell)

CE1—(Comparative Example 1)

Polyisocyanurate Comprising Material not Containing Polytetrahydrofuran Polyol and Containing PPG-425 as Short Chain Diol A curable composition was prepared by vacuum mixing for 3 minutes a mixture of 278.13 g Suprasec® 1306, 1.75 g of a solution of 5.00 wt % LiCl in 2-methyl-1,3-propanediol, 8.03 g Araldite® DY/T, 79.97 g of PPG-425 and 32.12 g of DPG. After cure for 15 minutes in heated mould (100° C.) the resin plate was demoulded and post-cured for 25 min at 170° C., including heat- and cool ramps at 3° C./min. SEN-3PB Fracture toughness testing (ISO13586) revealed a critical stress intensity factor ($K_{1p}$) of 1.08 MPa·m$^{1/2}$ and critical energy release rate ($G_{1c}$) of 393 J/m². Three point bending flexure testing (ISO178) revealed a flexural modulus of 3.21 GPa and a flexural strength of 134 MPa. DMTA revealed a $T_g$ of 154° C.

CE2—(Comparative Example 2)

Polyisocyanurate Comprising Material not Containing Polytetrahydrofuran Polyol and Containing Hoopol F1394 as Short Chain Diol A curable composition was prepared by vacuum mixing for 3 minutes a mixture of 276.80 g Suprasec® 1306, 1.62 g of a solution of 5.00 wt % LiCl in 2-methyl-1,3-propanediol, 8.05 g Araldite® DY/T, 79.96 g of Hoopol® F1394 and 33.72 g of DPG. After cure for 15 minutes in heated mould (100° C.) the resin plate was demoulded and post-cured for 25 min at 170° C., including heat- and cool ramps at 3° C./min. SEN-3PB Fracture toughness testing (ISO13586) revealed a critical stress intensity factor ($K_{1c}$) of 1.33 MPa·m$^{1/2}$ and critical energy release rate ($G_{1c}$) of 553 J/m². Three point bending flexure testing (ISO178) revealed a flexural modulus of 3.44 GPa and a flexural strength of 152 MPa. DMTA revealed a $T_g$ of 143° C.

E1—(Example 1 According to the Invention)

A Toughened Polyisocyanurate Comprising Material Containing 7.5 wt % pTHF-2000 and Containing PPG-425 as Short Chain Diol A curable composition was prepared by vacuum mixing for 3 minutes a mixture of 259.59 g Suprasec® 1306, 1.69 g of a solution of 5.00 wt % LiCl in 2-methyl-1,3-propanediol, 8.05 g Araldite® DY/T, 80.05 g of PPG-425, 21.56 g of DPG and 31.62 g of pTHF-2000. After cure for 15 minutes in heated mould (100° C.) the resin plate was demoulded and post-cured for 25 min at 170° C., including heat- and cool ramps at 3° C./min. SEN-3PB Fracture toughness testing (ISO13586) revealed a critical stress intensity factor ($K_{1c}$) of 2.13 MPa·m$^{1/2}$ and critical energy release rate ($G_{1c}$) of 1958 J/m$^2$. Three point bending flexure testing (ISO178) revealed a flexural modulus of 2.59 GPa and a flexural strength of 103 MPa. DMTA revealed a $T_g$ of 159° C.

E2—(Example 2 According to the Invention)

Figure 1:
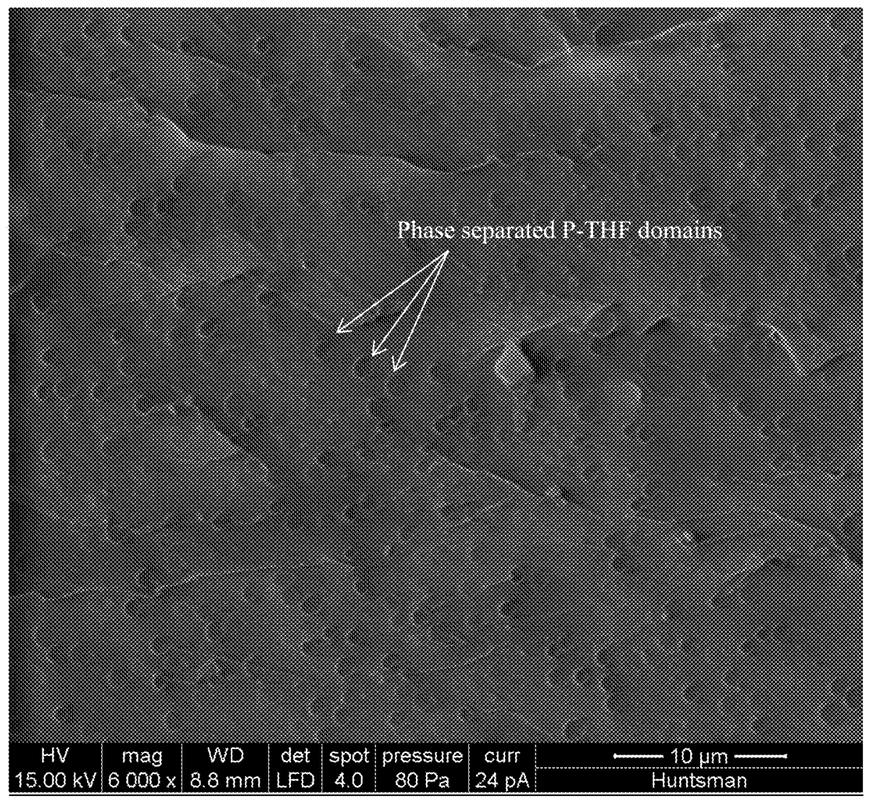
FIG. 1 is a SEM micrograph of the fracture surface of a toughened polyisocyanurate comprising material according to the invention using 7.5 wt % P-THF and containing short chain diols (Example 2 according to the invention).

A Toughened Polyisocyanurate Comprising Material Containing 7.5 wt % pTHF-2000 and Containing Hoopol F1390 as Short Chain Diol A curable composition was prepared by vacuum mixing for 3 minutes a mixture of 257.97 g Suprasec® 1306, 1.70 g of a solution of 5.00 wt % LiCl in 2-methyl-1,3-propanediol, 8.09 g Araldite® DY/T, 80.05 g of Hoopol® F1394, 22.44 g of DPG and 30.12 g of pTHF-2000. After cure for 15 minutes in heated mould (100° C.) the resin plate was demoulded and post-cured for 25 min at 170° C., including heat- and cool ramps at 3° C./min. SEN-3PB Fracture toughness testing (ISO13586) revealed a critical stress intensity factor ($K_{1c}$) of 2.55 MPa·m$^{1/2}$ and critical energy release rate ($G_{1c}$) of 2877 J/m$^2$. Three point bending flexure testing (ISO178) revealed a flexural modulus of 2.83 GPa and a flexural strength of 122 MPa. DMTA revealed a $T_g$ of 140° C. FIG. 1 is a SEM micrograph of the fracture surface of sample E2

The formulations of the curable compositions are shown in Table 1, the results are depicted in Table 2.

TABLE 1

| Sample | Suprasec 1306 | LiCl (5%) MPdiol | Araldite DY/T | PPG-425 | Hoopol F1394 | DPG | pTHF 2000 |
|---|---|---|---|---|---|---|---|
| CE1 | 278.13 | 1.75 | 8.03 | 79.97 | 0.00 | 32.12 | 0.00 |
| CE2 | 276.80 | 1.62 | 8.05 | 0.00 | 79.96 | 33.72 | 0.00 |
| E1 | 259.59 | 1.69 | 8.05 | 80.05 | 0.00 | 21.56 | 31.62 |
| E2 | 257.97 | 1.70 | 8.09 | 0.00 | 80.05 | 22.44 | 30.12 |

TABLE 2

| Sample | Glass transition temperature - $T_g$ ASTM D 4065-1 (° C.) | Critical energy release rate - $G_{1c}$ ISO13586 (J/m$^2$) | Critical stress intensity factor - $K_{1c}$ ISO13586 (MPa·m$^{1/2}$) | Flexural Modulus ISO178 (GPa) |
|---|---|---|---|---|
| CE1 | 154 | 393 | 1.08 | 3.21 |
| CE2 | 143 | 553 | 1.33 | 3.44 |
| E1 | 159 | 1958 | 2.13 | 2.59 |
| E2 | 140 | 2877 | 2.55 | 2.83 |

The invention claimed is:

1. A reactive curable composition for making polyisocyanurate comprising products having a glass transition temperature (Tg)>100.degree. C. measured according to ASTM D 4065-1, obtained by combining and mixing at an isocyanate index of at least 100:
   a) at least 40 wt % polyisocyanates calculated on the total weight of the curable composition, and
   b) 1-30 wt % of isocyanate reactive compounds selected from polytetrahydrofuran (P-THF) polyols having an average molecular weight in the range 1000-5000 g/mol as toughening agent calculated on the total weight of the curable composition, and
   c) at least 20 wt % of isocyanate reactive compounds selected from low molecular weight polyols having a number average molecular weight<1000 g/mol calculated on the total weight of the curable composition, and
   d) A trimerization catalyst composition, and
   e) Optionally further additives and/or auxiliary compounds, wherein the wt % of aromatic hydrocarbon rings in the curable composition (aromaticity) is at least 25 wt % calculated on the total weight of the reactive curable composition.

2. The curable composition according to claim 1, wherein the amount of polyisocyanates in the curable composition comprises at least 50 wt % polyisocyanates, calculated on the total weight of the reactive curable composition.

3. The curable composition according to claim 1, wherein the aromaticity of the curable composition is >30 wt %, calculated on the total weight of the reactive curable composition.

4. The curable composition according to claim 1, wherein the low molecular weight polyols comprise aromatic polyols.

5. The curable composition according to claim 4, 4 wherein the low molecular weight polyols comprise diols having a molecular weight (MW) below 1000 g/mol and are selected from alkylene glycols and/or oxyalkylene glycols.

6. The curable composition according to claim 5, wherein the diols are selected from polyethylene glycol and/or polypropylene glycol-(1,2) and -(1,3), polybutylene glycol-(1,4) and -(2,3), polyhexanediol-(1,6), polyoctanediol-(1,8) and mixtures thereof.

7. The curable composition according to claim 1, wherein the amount of P-THF in the curable composition is in the range from 1 wt % to 25 wt %, based on the total weight of the reactive curable polyisocyanate composition and wherein the molecular weight of the P-THF is in the range 1000-3000.

8. The curable composition according to claim 1, wherein the polyisocyanates are selected from aliphatic, cycloaliphatic, araliphatic and, aromatic polyisocyanates, and mixtures thereof.

9. The curable composition according to claim 1, wherein the trimerisation catalyst composition is selected from alkali, earth alkali metal salts of organic carboxylic acids, or mixtures thereof.

10. The curable composition according to claim 1, wherein the trimerisation catalyst composition is selected from a composition containing a lithium halide, an epoxy resin and optionally a urea compound.

11. The curable composition according to claim 1, wherein the trimerisation catalyst composition is used in a quantity of from 0.001 to 10 wt %, calculated on the total weight of the curable composition.

12. The curable composition according to claim 1, wherein the auxiliary compounds are selected from non-isocyanate-reactive solvents, surfactants, scavengers, antimicrobial agents, fire retardants, smoke suppressants, UV-stabilizers, colorants, plasticizers, internal mould release agents, rheology modifiers, wetting agents, dispersing agents and fillers.

13. The curable composition according to claim 1, wherein the auxiliary compounds comprise filler materials which are selected from wood chips, wood dust, wood flakes, wooden plates; paper and cardboard, sand, vermiculite, clay, cement and other silicates; ground rubber, ground thermoplastics, ground thermoset materials; honeycombs of any material, metal particles and plates; cork in particulate form or in layers; natural fibers; synthetic fibers; mineral fibers; mineral fillers; nanoparticles; glass beads, ground glass, hollow glass beads; expanded or expandable beads; untreated or treated waste; woven and non-woven textiles; and combinations of two or more of these materials.

14. A process for making the curable composition according to claim 1, which comprises combining and mixing the ingredients (a) to (e) at ambient pressure and at a temperature between 5° C. and 45° C.

15. A method for making polyisocyanurate comprising materials having a glass transition temperature (Tg)>100.degree. C. measured according to ASTM D 4065-1 and improved fracture toughness value $G_{1c}$>500 J/m$^2$ measured according to ISO 13586, said method comprises at least the steps of allowing the curable composition according to claim 1, to react at an isocyanate index of at least 100 and at a curing temperature above 50° C.

16. The method for making polyisocyanurate comprising materials according to claim 15, wherein said method is a batch-wise, semi-continuously or continuously process, an injection-, an extrusion-, a pultrusion process or moulding process.

17. The method for making polyisocyanurate comprising materials according to claim 15, wherein the isocyanate index is in the range 100 up to 15000.

18. The method for making polyisocyanurate comprising materials according to claim 15, wherein the curing temperature is between 50° C. and 350° C.

19. A polyisocyanurate comprising material obtained by the method according to claim 15, having a glass transition temperature >100° C. measured according to ASTM D 4065-1, a fracture toughness value $G_{1c}$>1000 J/m$^2$ measured according to ISO 13586.

20. A polyisocyanurate comprising material obtained by the method according to claim 15, having a glass transition temperature >150° C. measured according to ASTM D 4065-1, a fracture toughness value $G_{1c}$>500 J/m$^2$ measured according to ISO 13586.

21. The curable composition according to claim 1, wherein the amount of polyisocyanates in the curable composition comprises at least 60 wt % polyisocyanates, calculated on the total weight of the reactive curable composition.

22. The curable composition according to claim 1, wherein the polyisocyanates are selected from toluene diisocyanate or diphenylmethane diisocyanates.

23. A process for making the curable composition according to claim 1, which comprises combining and mixing the ingredients (a) to (e) at ambient pressure and at a temperature between 5° C. and 30° C.

* * * * *